UNITED STATES PATENT OFFICE.

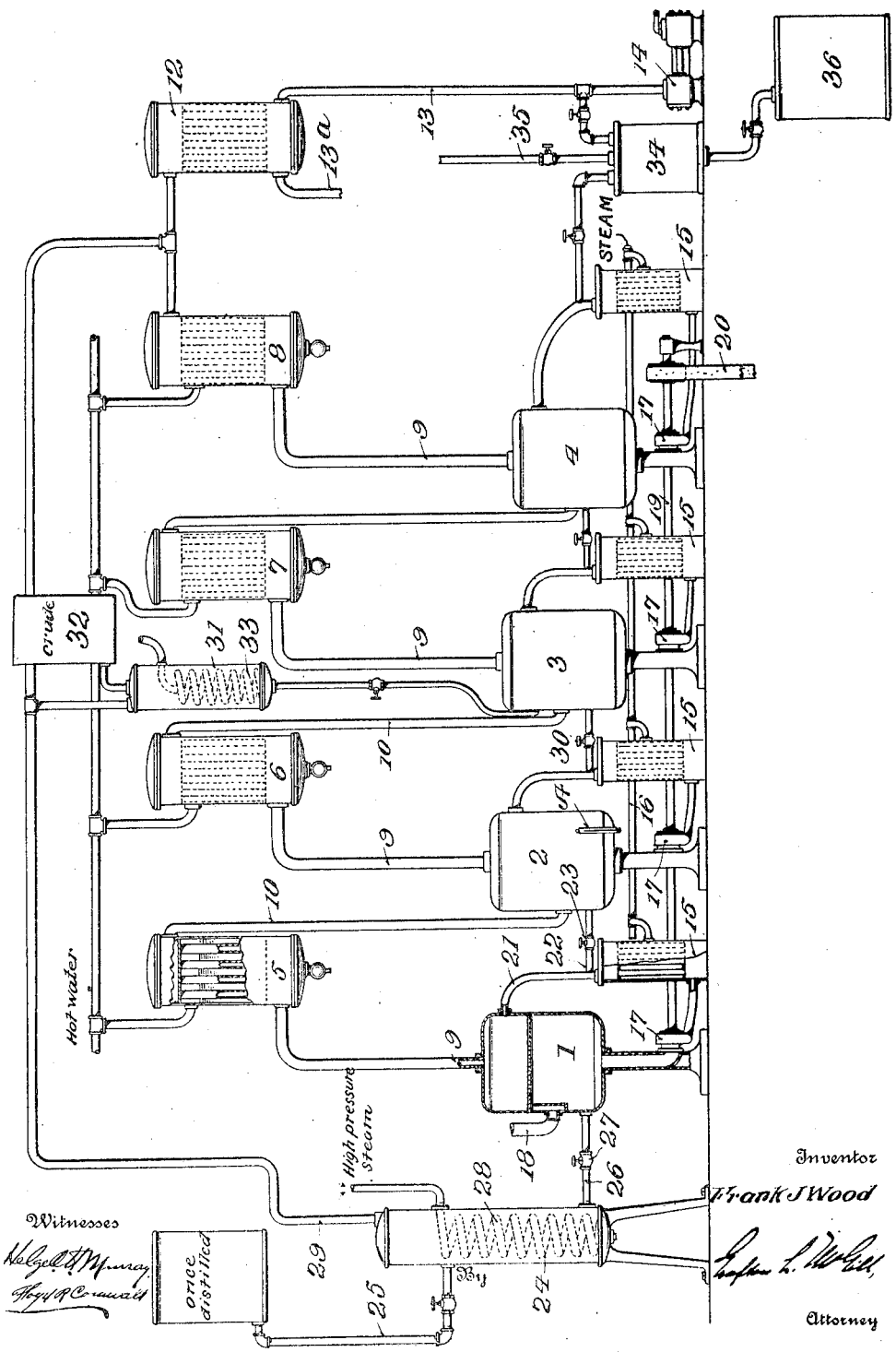

FRANK J. WOOD, OF NEW YORK, N. Y., ASSIGNOR TO MARK AND RAWOLLE, OF NEW YORK, N. Y., A CORPORATION OF NEW YORK.

PROCESS OF DISTILLING GLYCERIN.

1,089,383.

Specification of Letters Patent. Patented Mar. 3, 1914.

Application filed January 15, 1910. Serial No. 538,306.

*To all whom it may concern:*

Be it known that I, FRANK J. WOOD, of the city of New York, State of New York, have invented certain new and useful Improvements in Processes of Distilling Glycerin; and I do hereby declare the following to be a full, clear, and exact description of the invention, such as will enable others skilled in the art to which it appertains to make and use the same.

This invention relates to the distillation of glycerin and similar materials which are partially decomposable during distillation and which have a boiling point higher than that of water.

The invention is an elaboration of the multiple effect distilling principle covered by Letters Patent No. 881,525 of March 10, 1908, issued on my application.

The two main purposes of the present invention are to prevent the accumulation in the stills of refuse or "foots", and to minimize the foaming which is apt to occur during distillation owing to the presence of water in the glycerin supply. To attain these purposes I first eliminate the water by vaporizing it out of the glycerin and introduce the substantially anhydrous glycerin to the first still of a plurality of stills connected in series and to each of the stills in succession, or to as many as desired, a low level of the glycerin being maintained in each of the stills. A portion of the glycerin current is distilled at each still and condensed, and the foots are finally collected and treated, chemically or otherwise. The single steam column used in all of the distillations also passes to all of the stills in succession, as in the Letters Patent above referred to.

In the accompanying drawing I have illustrated an arrangement of mechanism appropriate to carrying out the present process.

As illustrated, a plurality of stills in series is shown at 1, 2, 3, 4, and their respective hot water glycerin condensers at 5, 6, 7, 8, each still being connected to its condenser by a pipe 9, while a pipe 10 leads the steam, out of which the glycerin vapors have been condensed, to the succeeding still. The condenser 8 is shown in communication with a cold water sweet-water condenser 12 from which a pipe 13 leads to a vacuum pump 14, and from which a pipe 13ª may lead to an evaporator, not shown.

Each of the stills is provided with a contiguous glycerin heater 15, supplied with steam from pipe 16, through which heater glycerin withdrawn from the bottom of the still may be forced by a pump 17 and again introduced in the still at the upper part thereof and falling in divided columns be mingled with the steam entering at 18. This arrangement of still and heater and the interior construction of the still are, or may be, like those shown in Letters Patent No. 910,440 issued on my application January 19, 1909. The pumps 17, preferably of the centrifugal type, may be operated by a shaft 19 driven by a hand 20 connected with a suitable engine. The pipe 21 leading from the heater 15 of still 1 into the upper part of the still is connected to the succeeding still 2 by a pipe 22 having a valve 23 therein, the pipe 22 entering the still near the bottom thereof. This division of the heated glycerin by which a portion goes into still 1 and the rest into still 2 may be repeated with as many stills as desired.

In practice the normal level of the glycerin within each still is about that indicated in still 1, this volume being readily maintained by the pump 17 and shown by a sight opening indicated at A in still 2. The space thus maintained between the outlet of pipe 21 within the still and the body of glycerin at the bottom of the still affords ample opportunity for the gravitating streams of glycerin to associate with the steam column entering at 18 and to vaporize and pass upward through pipe 9 to the condenser without being retarded by an undue quantity of liquid glycerin in the stills. Furthermore by maintaining the relatively low level of glycerin in the stills the tendency of impurities to prime over with the vapors and spoil the condensate is reduced to a minimum.

At 24 I have shown the pre-heater to which glycerin may be supplied through a pipe 25 and from which it passes to still 1 through a pipe 26 having a valve 27. High pressure steam passes through a coil 28 contained in the pre-heater. The water that may be contained in, or carried by, the glycerin will vaporize at temperatures from 110 to 180 degrees Fahrenheit, under the vacuum maintained in the pre-heater and stills, while the body of glycerin would require 280 degrees Fahrenheit or more. Hence by the steam within the coil being at a temperature less than the boiling point of the glycerin the substantially liquid condition of the latter will not be materially altered but the water will be converted into steam and will pass through pipe 29 to the sweet-water condenser 12, carrying with it such glycerin and volatile impurities as may have evaporated in the pre-heater. This leaves a substantially anhydrous glycerin to be supplied to still 1 on opening the valve 27. The pump 17 being in operation withdraws the glycerin from the still and forces it through the heater 15 and pipe 21 to the still. In passing through pipe 21, however, the glycerin finds an outlet through pipe 22 and (the valve 23 being open) thence to the still 2, the pipe being on a plane lower than the outlet of pipe 21. The portion of the glycerin continuing through pipe 21 past pipe 22 to the still gravitates therein in divided columns and unites with the steam current entering at 18 and the combined vapors pass through pipe 9 to the hot water condenser 5 where the glycerin is condensed out of the steam and the latter passes through pipe 10 to still 2 according to the multiple effect principle set forth in the Letters Patent No. 881,525 above referred to. The unvaporized glycerin and foots will fall to the bottom of the still to be again withdrawn by the pump and heated and returned to the one or conducted to the other of the stills. Some slight quantity of water may remain in the glycerin when it leaves the pre-heater, but in the first still this will readily vaporize and will not be sufficient to cause foaming.

The glycerin from the pre-heater 24 might supply any number of stills connected as by pipes 22 and the current of steam would be available for all the distillations. Naturally, however, the steam when pure is of greater value for attaining a pure distillate than when it carries with it the vapors of impurities and fatty acids which might contaminate the glycerin. For this reason when the single steam current is being supplied to a plurality of stills in succession, the stills may be divided into two or more groups, the first group distilling first quality and the subsequent groups distilling the quality that is to be distilled again. In the present case, for instance, I prefer to use once-distilled glycerin in the group comprising stills 1 and 2 and to inject pure steam through pipe 18; pass the glycerin from still 1 to 2 as stated, but close valve 30 between stills 2 and 3. The steam current, however, is maintained and may continue from condenser 6 to the second group of stills, 3 and 4. Here crude glycerin may be distilled as the partially refined glycerin was distilled in stills 1 and 2. I have accordingly shown at 31 a crude glycerin pre-heater forming part of the connection between a receptacle 32 and still 3, the pre-heater containing a steam coil 33. The operation in this pre-heater, stills 3 and 4 and their respective condensers is the same as described with reference to the pre-heater 24 and stills 1 and 2. From the last glycerin condenser 8 the vapors pass to the steam condenser 12 and then through pipe 13ª to an evaporator, where may be recovered the glycerin carried over from condenser 8 and that which may have vaporized in the pre-heater and passed through pipe 29. The unvaporized glycerin and the foots in still 4 pass to a monte jus 34 in communication with the vacuum pump. By steam pressure entering the monte jus as at 35 the foots as well as the unvaporized glycerin are forced out of the system into a receptacle indicated at 36, the contents of which may be treated by any appropriate method to recover the glycerin.

The step in the process of utilizing a second pre-heater as 31 is obviously no departure from the idea present in the previous steps; it is recited merely as showing an appropriate use of the steam current after it has served in two or more distillations of relatively pure glycerin and also a manner of disposing of the foots contained in the once distilled glycerin.

I claim as my invention:—

1. The process of effecting a series of distillations of glycerin or similar material, consisting of conducting a body of glycerin successively to a plurality of stills and condensers in series and vaporizing and condensing a portion of the glycerin at each still and condenser, respectively.

2. The process of effecting a series of distillations of glycerin or similar material, consisting of vaporizing the water out of the glycerin, conducting the substantially anhydrous glycerin successively to a plurality of stills and condensers in series, and vaporizing and condensing a portion of the glycerin at each still and condenser, respectively.

3. The process of effecting a series of distillations of glycerin or similar material, consisting of vaporizing the water out of the glycerin, conducting the substantially anhydrous glycerin to the first still and condenser of a series of stills and condensers, vaporizing and condensing a portion of the glycerin contained within the first still and condenser, transferring the balance of the glycerin from still to still in succession, and vaporizing and condensing at each still and condenser respectively.

4. The process of effecting a series of distillations of glycerin or similar material, consisting of conducting a body of glycerin successively to a plurality of stills in series, and vaporizing a portion of the glycerin at each still and condensing in condensers which alternate with each still by the agency of a single current of steam conducted successively to all of the series of stills alternating with condensers.

5. The process of effecting a series of distillations of glycerin or similar material, consisting of conducting a body of glycerin successively to a plurality of stills arranged in alternate series with their respective condensers, and combining with the glycerin at each of the succeeding stills the steam out of which the glycerin vapors of a previous distillation have been condensed in one of said condensers.

In testimony whereof, I have signed this specification in the presence of two subscribing witnesses.

FRANK J. WOOD.

Witnesses:
GRAFTON L. McGILL,
D. H. BATES, Jr.